April 23, 1963  J. B. McANDREW  3,086,806
HANDLE

Filed Dec. 22, 1960  2 Sheets-Sheet 1

INVENTOR.
JOHN B. McANDREW

BY Teare & Felzer
ATTORNEYS

April 23, 1963    J. B. McANDREW    3,086,806
HANDLE

Filed Dec. 22, 1960    2 Sheets-Sheet 2

INVENTOR.
JOHN B. McANDREW
BY
Teare & Fetzer
ATTORNEYS

United States Patent Office 3,086,806
Patented Apr. 23, 1963

3,086,806
HANDLE
John B. McAndrew, Cleveland, Ohio, assignor of one-third to Webb C. Jennings, Rocky River, one-third to Ira T. Swartwood, Lakewood, and one-third to Rudolph A. Sampson, Cleveland, all in Ohio
Filed Dec. 22, 1960, Ser. No. 77,775
3 Claims. (Cl. 294—33)

This invention relates in general to a detachable handle for containers, and more particularly to a simplified flexible handle for holding upstanding boxes or containers, such as those composed of paperboard and the like, and for instance those used in the retention of liquids.

Various types of handles for containers, such as milk cartons, are known in the art. However, none of these prior art handles have been commercially successful, due in part to their being of such structural arrangements that they cannot be economically produced and marketed.

The present invention provides a simplified handle for containers, which handle is formed of flexible material, preferably moldable plastic material, resulting in an economical item of manufacture, and which handle is readily attachable to and detachable from the container, and is operable to positively hold or grip the container when assembled therewith.

Accordingly an object of the invention is to provide an improved, flexible, detachable handle arrangement for containers.

Another object of the invention is to provide a flexible handle for containers, such as milk cartons, which is of economical and simplified construction, and which is operable to effectively and positively clasp or hold the container when assembled therewith.

A further object of the invention is to provide a handle of the above type which is economical to manufacture, utilizing mass production procedures, and which can be readily prepared for shipment utilizing a minimum of space.

Briefly, the foregoing objects are accomplished by the provision of a handle formed from flexible material, preferably plastic material, such as for instance polyethylene, and wherein the handle is produced in a generally flattened orientation of a pair of spaced loop portions connected by an intermediate hand gripping portion. The gripping portion at each end thereof is joined to the respective loop portion by a widened section of material which is adapted to be twisted in a torsion-like effect when the handle is assembled with a container, whereby the loop portions are biased or urged divergingly with respect to one another into positive frictional gripping relation with the container.

Figure 1:
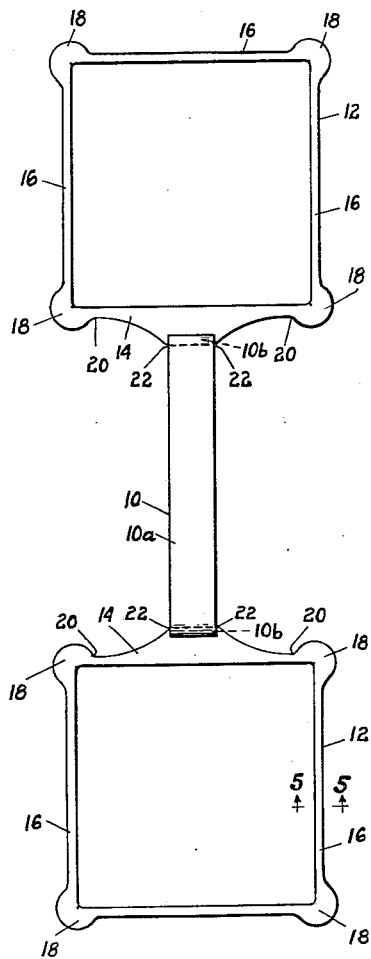
Figure 2:
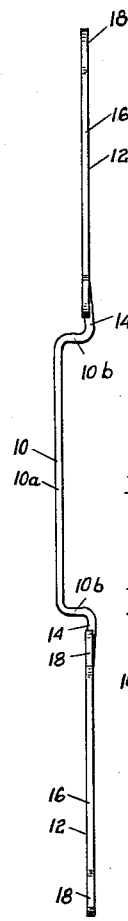
Figure 3:
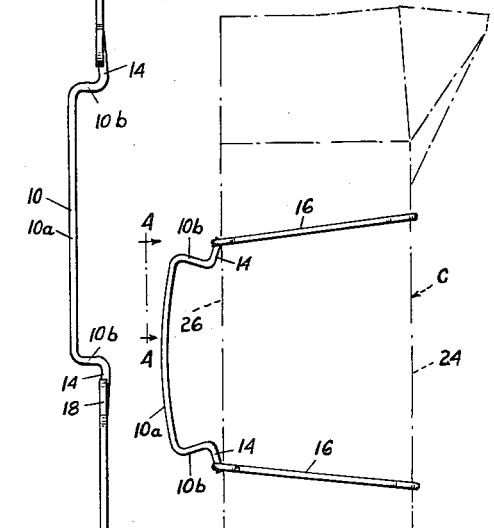
Figure 4:
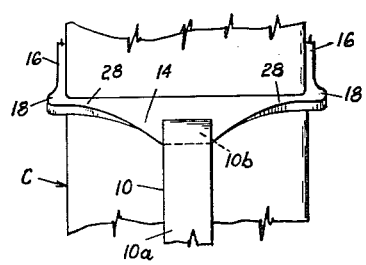
Figure 5:
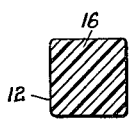
Figure 6:
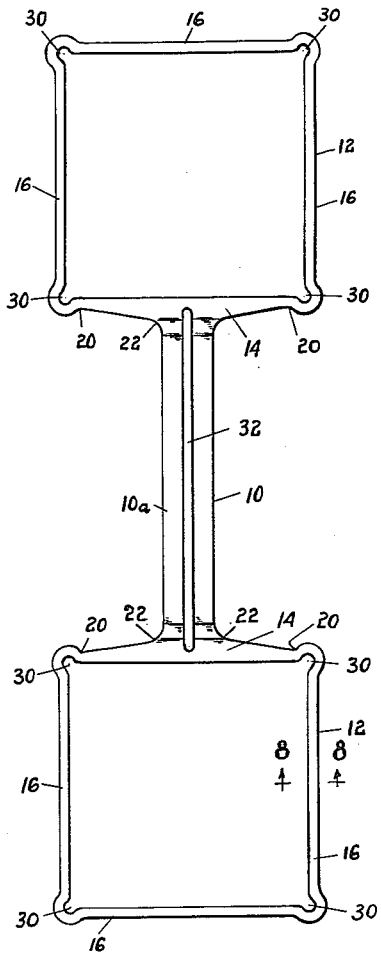
Figure 7:
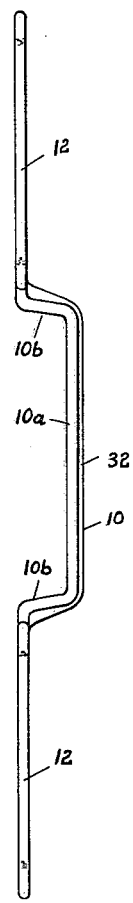
Figure 8:
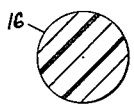

Other objects and advantages of the invention will be apparent from the following description taken in conjunction with the accompanying drawings wherein:

FIG. 1 is a plan view of the handle of the invention;
FIG. 2 is a side elevational view of the handle shown in FIG. 1;
FIG. 3 is a side elevational view of a container (shown in phantom lines) illustrating the handle of the invention assembled therewith;
FIG. 4 is an enlarged, fragmentary, side elevational view taken generally along the plane of line 4—4 of FIG. 3 looking in the direction of the arrows;
FIG. 5 is an enlarged sectional view taken along line 5—5 of FIG. 1 looking in the direction of the arrows;
FIG. 6 is a top or outer plan view of a modified form of the handle;
FIG. 7 is a side elevational view of the handle illustrated in FIG. 6;
FIG. 8 is an enlarged sectional view taken generally along line 8—8 of FIG. 6, looking in the direction of the arrows.

Referring now again to FIGS. 1 to 5 of the drawings, the detachable handle of the invention comprises an elongated strap-like hand gripping portion 10 having loop portions 12 attached thereto at its opposite ends. Hand gripping portion 10 is of generally C or channel shaped configuration in side elevation, and comprises a main body section 10a and leg sections 10b extending outwardly from body section 10a. The handle is formed of flexible material, preferably a moldable plastic material, such as polyethylene. Leg sections 10b are generally rigidly connected to the main body section 10a of the gripping portion and extend generally normal to such main section 10a of the gripping portion, with the legs 10b being connected to the respective loop portion 12 by a widened section 14 of loop portion material, the purpose of which will be hereinafter discussed. In other words, there is a greater area of material at section 14 of the respective loop as compared to the area of the individual boundary sections 16 defining the remainder of the respective loop 12. Exterior corners 18 of the loops are preferably widened arcuately as shown, to reinforce and rigidify such corners. Section 14 commences as at 20 adjacent the respective corner of the loop and slopes outwardly therefrom to merge as at 22 with the respective leg section 10b of the gripping portion 10, to provide a generally trapezoidal configuration in plan. The loops 12 are adapted to encircle a container, such as the milk carton C illustrated in FIG. 3.

As originally produced, and as shown in FIGS. 1 and 2, the handle is of a generally flat structural arrangement so that a large number of such articles may be packed in stacked relation in a relatively small space, thereby facilitating their storage, handling and marketing. However, when the handles are assembled on a container, the body section 10a of the handle bows outwardly as shown in FIG. 3, to further space the body section 10a from the confronting side of the carton, while the widended sections 14 of the loops are twisted as at 28 in torsion, as best shown in FIG. 4, which due to the resiliency of the material, urges the loops divergingly outward from one another and into positive frictional gripping relation with the container, and especially the front and rear sides 24 and 26 respectively thereof. It will be seen that it is the resistance to twisting of the widened sections 14 of the loops, together with generally rigid relation of the connection between the respective leg 10b and the respective widened section 14 of the loops, which provides for the effective biasing of the loops outwardly with respect to one another when assembled on the carton. If the handle is removed from the container, it tends to regain its original generally flattened orientation of parts.

Referring now to FIGS. 6 through 8, there is illustrated a modified form of the handle of the invention. In this modification, the interior corners of the openings defined by the loops are each provided with an outwardly extending arcuate recess 30, to thereby increase the flexibility of such corners and facilitate the assembly of the loops onto the container. Moreover, in this embodiment, the loop boundary sections 16 may be of generally circular configuration in cross section, as shown in FIG. 8. Moreover, the hand gripping portion 10 is provided with a centrally disposed, elongated rib 32, which extends the full length of the hand gripping portion, and merges at its ends into the widened sections 14 of the loops. Rib 32 increases the general rigidity of the handle gripping portion and the rigidity of the connections of the leg portions 10b with loop sections 14. Moreover, it will be seen from FIG. 7 that the leg portions 10b are disposed in slightly angular relationship with respect to the body section 10a of the gripping portion as opposed to the generally normal relationship of the leg sections in the first described embodiment of the invention.

From the foregoing discussion and accompanying drawings it will be seen that the present invention provides a novel detachable handle for containers and the like, which handle is formed of flexible material, such as the known plastic polyethylene, and wherein the handle includes a centralized elongated hand gripping portion and loop portions disposed at opposite ends of the gripping portion, with such loop portions including a widened section of material which widened section is adapted to be twisted in torsion on assembly of the handle with a container, for urging the loop portions divergingly outwardly with respect to one another and into positive frictional gripping relation with the container. The invention also provides a handle which is economical to manufacture, and which necessitates a minimum of space to store and to ship.

While the loop portions of the handle have been illustrated as defining a rectangular configuration of openings for receiving the container, it will be understood that other configurations of openings could be provided for assembly of the handle with cylindrical-like containers, or containers of other polygonal shaped configurations in horizontal cross section.

The terms and expressions which have been used are used as terms of description and not of limitation and there is no intention in the use of such terms and expressions of excluding any equivalents of any of the features shown or described, or portions thereof, but it is recognized that various modifications are possible within the scope of the invention claimed.

I claim:

1. A detachable handle for assembly with a container, said handle comprising a generally flexible material and including a generally C-shaped, in side elevation, hand gripping-portion with closed loop portions joined to the opposed ends of said gripping portion, said gripping portion comprising an elongated main body section having spaced legs generally rigidly connected to said body section and extending generally normally outwardly from said body section, each of said closed loop portions at its connection to said gripping portion comprising a widened section of material as compared to the remainder of said loop portion commencing at said body section and diverging outwardly therefrom to merge with the confronting boundary section of the respective loop portion defining, in plan, a generally trapezoidal configuration, said widened sections of material being rigidly secured to the respective of said legs and extending generally normally outwardly therefrom to provide a pair of flexible, generally L-shaped junctures with said legs between said body section and the respective of said loop portions, whereby the resilient stress afforded by said flexible junctures when the widened sections of material are twisted in torsion, causes the loop portions to be urged divergently away from one another into positive gripping relation upon assembly with a container.

2. A detachable handle in acordance with claim 1, wherein the exterior corners of said loop portions are wider as compared to the width of the adjacent boundary portions of the respective loop portions to reinforce said loop portions adjacent said corners, and wherein the interior corners of said loop portions are each provided with arcurate recesses therein communicating with and extending outwardly from the opening defined by the respective loop portions.

3. A detachable handle in accordance with claim 1, wherein said handle is comprised of a moldable plastic material such as polyethylene.

References Cited in the file of this patent

UNITED STATES PATENTS

| 1,448,086 | Paull | Mar. 13, 1923 |
| 2,617,676 | Kinney | Nov. 11, 1952 |
| 2,789,744 | Brooks | Apr. 23, 1957 |
| 2,812,968 | Sevener | Nov. 12, 1957 |

FOREIGN PATENTS

| 207,455 | Great Britain | Nov. 29, 1923 |